June 19, 1934.   F. B. NEWELL   1,963,860

BAROMETER

Filed March 7, 1930

INVENTOR:
Floyd B. Newell
BY
Alfred Burger
ATTORNEY

Patented June 19, 1934

1,963,860

UNITED STATES PATENT OFFICE 1,963,860

BAROMETER

Floyd B. Newell, Rochester, N. Y., assignor to Taylor Instrument Companies, Rochester, N. Y., a corporation of New York Application March 7, 1930, Serial No. 433,972

5 Claims. (Cl. 73—4)

This invention relates more particularly to barometers, but applies generally to all indicating instruments in connection with which it may be of importance to know in which direction, at the time of observation, the pointer tends to move.

Barometer readings, as is well known, have no fixed interpretation. The correct interpretation of a barometric pressure indication depends primarily upon the question whether the indication has been reached during a rising movement or during a falling movement. For this reason, it becomes of great importance, to know in which direction the movement of the pointer takes place at the time of observation.

It is the object of this invention to provide means for indicating the tendency of motion of a barometer pointer.

It is a more special object to provide means for indicating the tendency of motion of a barometer pointer, without imposing too much frictional load upon the power plant of the instrument.

Figure 1:
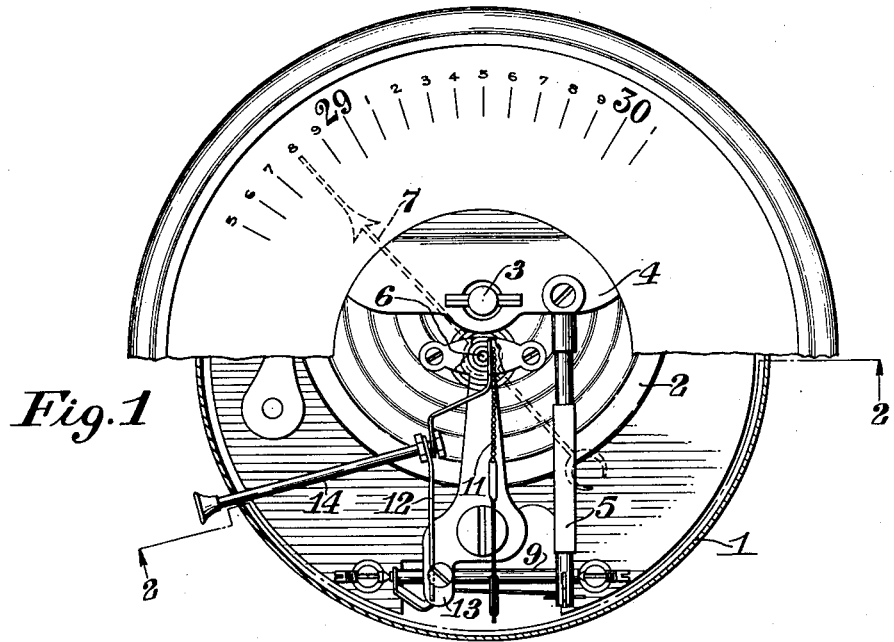
Figure 2:
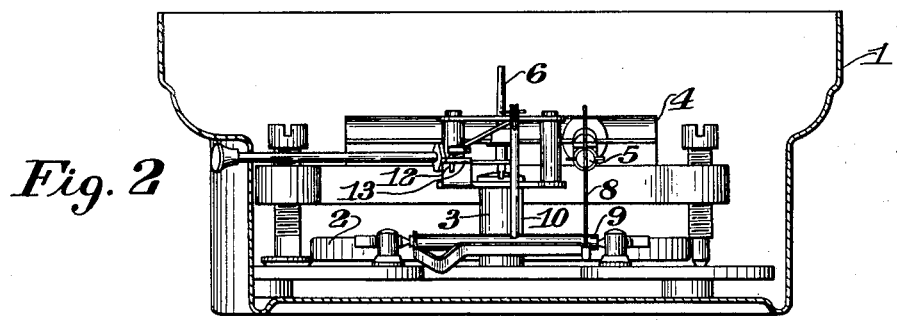

For a full understanding of the invention, reference is made to the accompanying drawing wherein Fig. 1 is a plan view of a device embodying the invention, parts being broken away to show the salient parts thereof; and Fig. 2 is a section taken on line 2—2, Fig. 1.

The barometer itself is of the usual form composed of a casing 1 within which is mounted the operating mechanism including a vacuum diaphragm 2, stud 3, spring 4, arm 5 attached to and carried by the spring 4, arbor 6 on which the pointer 7 (shown in dotted line) is mounted and mechanism including crank arm 8, crank shaft 9, arm 10 and chain 11 for transmitting motion from the diaphragm via arm 5 to the pointer 7.

The invention, briefly expressed, consists of mechanism for imposing a definite load upon the power plant of the instrument and means operable at will to remove the load.

In the particular embodiment shown, I provide a spring 12 attached at one end to a stationary part 13 and bearing at its other end against the arbor 6. The spring 12 is provided intermediate its ends with a loop or the like to be engaged by a push rod 14 extending through a hole in the casing to the outside so as to be manipulated. The spring 12 is so disposed and adjusted as to introduce a very small frictional load upon the arbor.

The operation is as follows:

Whether the pointer moves in one direction or the other, it always has to carry the small load represented by the spring 12 and this load is so dimensioned as to cause a slight lag or retardation in the motion of the pointer. When the rod 14 is pushed inwardly so as to push the spring 12 out of engagement with the arbor, the removal of the spring load causes the system to adjust itself accordingly and the pointer to move perceptibly in one direction. This motion is in the form of a slight but distinctly noticeable jump. It is understood that the magnitude of this jump is a function of the frictional load upon the arbor by the spring and therefore may be varied by changing the frictional load as desired. Naturally, however, it is not desirable to make the load any greater than is necessary to obtain a distinctly perceptible motion when it is removed.

In the foregoing I have described a simple attachment to a barometer to explain the principle of operation on which the invention is based. The nature of the means for effecting a separate load upon the power plant and the means for releasing it, may be varied within wide limits.

I claim:

1. In an aneroid barometer, the combination with the operating mechanism including the aneroid diaphragm, the pointer and means for transmitting motion from the diaphragm to the pointer, of means for normally imposing a separate retarding load upon the said mechanism sufficient to slightly impede but not to materially interfere with the operation of the mechanism, and means operable at will to release said separate retarding load.

2. In an aneroid barometer, the combination with the operating mechanism including the aneroid diaphragm, the pointer and means for transmitting motion from the diaphragm to the pointer and a case enclosing the said mechanism, of means for imposing a separate frictional load upon the said mechanism sufficient to slightly impede but not to materially interfere with the operation of the mechanism, and means operable at will from outside the case to release the said separate frictional load.

3. In an aneroid barometer, the combination with the operating mechanism including the aneroid diaphragm, the pointer and means for transmitting motion from the diaphragm to the pointer, and a case enclosing the said mechanism, of resilient means for imposing a separate frictional load upon the said mechanism sufficient to slightly impede but not materially interfere with the operation of the mechanism, and means operable at will from outside the case to release the said separate frictional load.

4. In an aneroid barometer, the combination with the operating mechanism including the aneroid diaphragm, the arbor, the pointer mounted thereon, means for transmitting motion from the diaphragm to the arbor, and a case enclosing said mechanism, of a spring normally bearing on said arbor, and means operable at will to remove the spring from engagement with said arbor.

5. In an aneroid barometer, the combination with the operating mechanism including the aneroid diaphragm, the arbor, the pointer mounted thereon, means for transmitting motion from the diaphragm to the arbor, and a case enclosing said mechanism, of a spring normally bearing on said arbor, and means operable at will from outside of the case to remove said spring from engagement with said arbor.

FLOYD B. NEWELL.